United States Patent [19]

Sakaguchi et al.

[11] 3,918,802
[45] Nov. 11, 1975

[54] MOTION PICTURE CAMERA WHICH CAN USE DIFFERENT KINDS OF FILM CARTRIDGES CONTAINING DIFFERENT LENGTH OF FILM

[75] Inventors: Keiichi Sakaguchi, Yokohama; Yoshio Komine, Tokyo; Toshikazu Ichiyanagi, Tokyo; Mamoru Shimazaki, Tokyo; Kazuya Hosoe, Machida, all of Japan

[73] Assignee: Canon Kabushiki Kaisha, Tokyo, Japan

[22] Filed: Apr. 19, 1974

[21] Appl. No.: 462,541

[30] Foreign Application Priority Data
Apr. 23, 1973 Japan.............................. 48-46386
Apr. 23, 1973 Japan.............................. 48-46394

[52] U.S. Cl. ................... 352/72; 352/172; 242/197
[51] Int. Cl.² ....................................... G03B 23/02
[58] Field of Search............. 352/72, 78 C, 73, 172; 242/197, 198, 199, 200

[56] References Cited
UNITED STATES PATENTS
3,297,397  1/1967  Grant................................ 352/172
3,312,158  4/1967  MacMillin...................... 352/78 C
3,578,856  5/1971  Thate............................... 352/172
3,807,841  4/1974  Dudley............................. 352/72

Primary Examiner—Monroe H. Hayes
Attorney, Agent, or Firm—Toren, McGeady and Stanger

[57] ABSTRACT

The present invention relates to a motion picture camera which can use more than two kinds of film cartridges with a completely identical relation between the opening for exposure and the winding up shaft and containing different length of film, in which the camera is characterized in that a footage counter corresponding to the size of the film cartridge can automatically be switched over in functional engagement with the exchange of different kinds of film cartridges. The winding up torque of the film winding up mechanism can be also automatically switched over.

30 Claims, 20 Drawing Figures

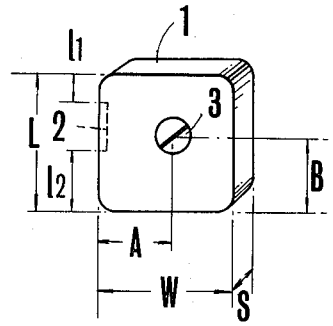
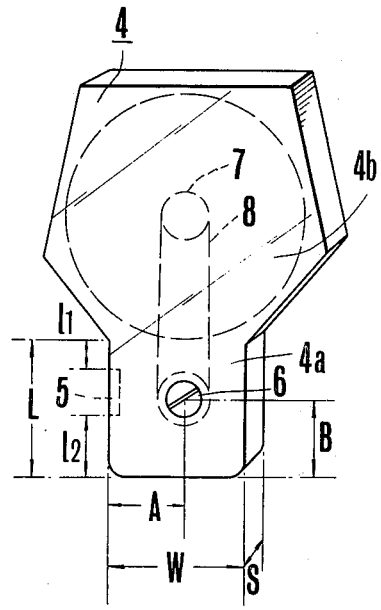
FIG. 1a
FIG. 1b
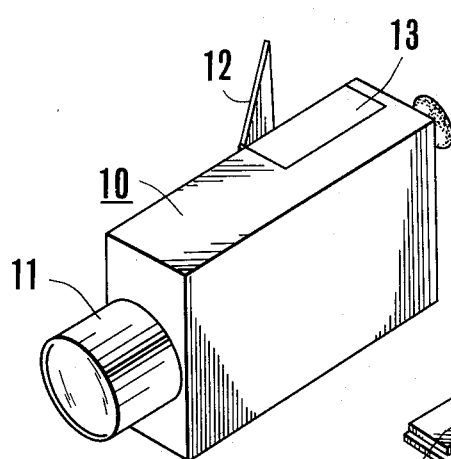
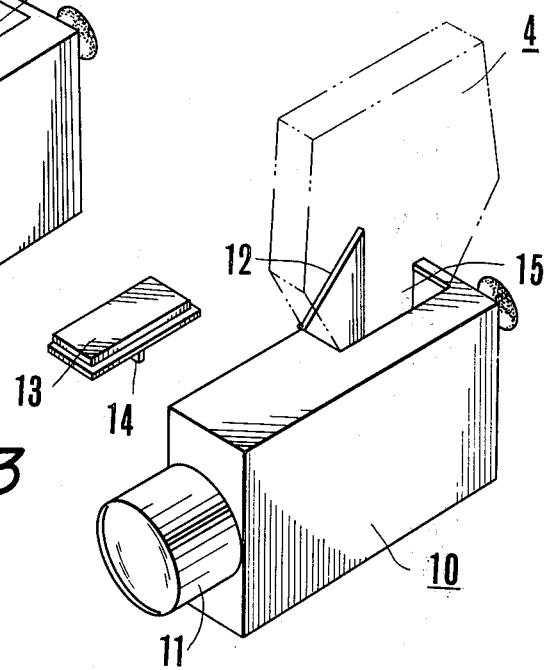
FIG. 2
FIG. 3

MOTION PICTURE CAMERA WHICH CAN USE DIFFERENT KINDS OF FILM CARTRIDGES CONTAINING DIFFERENT LENGTH OF FILM

BACKGROUND OF THE INVENTION

1. Field of the Invention

The present invention relates to a motion picture camera which can use more than two kinds of film cartridge with a completely identical relation between the opening for exposure and the winding up shaft and containing different length of film.

2. Description of the Prior Art

Recently, film of the cartridge type presenting a film opening and a winding up shaft outside of the cartridge is in use in the field of the small motion picture. The capacity of this type of film cartridge to contain film is more or less 50 ft while, according to the purpose of motion picture, a film cartridge containing a film as long as 200 ft is to be taken into consideration.

A film cartridge containing a film as long as 200 ft consists of a portion to be contained in the camera body and a portion to contain the film disposed next to the portion to be contained in the camera body, the portion to be contained in the camera body presents a relation between the opening for exposure and the winding up shaft identical to that of the film cartridge of the standard size type (i.e. for the film as long as 50 ft) while at the one end of the portion to be contained in the camera body, a portion to contain a long size film is attached. In this portion to be contained in the camera body a rotating shaft is provided which received driving power of the motion picture camera while in the portion to contain a long size film a winding up shaft is provided for winding up the film. Thus between the rotation shaft and the winding up shaft, a rotation transmitting member is provided for transmitting the driving power of the rotating shaft to the winding up shaft which winds up the film.

It is remarkably unprofitable, however, from the view-point of economy and portablility to provide a motion picture camera which uses the film cartridge of the standard size type and another motion picture camera which uses the film cartridge of the long size type. Therefore in order that a camera could use film cartridges of different size types, the following problems have to be solved. Namely the footage counter mechanism should be switched over so as to correspond to the length of the particular film, which is essential for a camera when films of different length are used. If the above mentioned problem is not solved there could take place the possibility that a photographing chance could be lost because of a possible misunderstanding of the quantity of the film already consumed. Furthermore the switching mechanism is complicated, the mechanism is easily damaged or broken due to the mishandling because the operation becomes complicated.

Nextly, as is usually known, the larger the film capacity, the more winding up torque is needed at the camera side when film cartridges of different film capacity are used. In this manner, waste of battery energy occurs in always supplying the motion picture camera with a winding up torque sufficient for winding up all kinds of film cartridge. Moreover in the motion picture camera, a battery is to be placed in a certain limited space so that the capacity of the battery is also limited. It is therefore a very important problem to drive a motion picture camera with least waste of current energy.

Thus, as the second step, a motion picture camera must be able to deliver the winding up torque in accordance with the film capacity when the film capacity differs.

The fact that such an important problem has not been solved has so far made it impossible to use film cartridges of different film capacity in the same camera.

SUMMARY OF THE INVENTION

The first purpose of the present invention is to solve the above mentioned problems and to offer a motion picture camera which can use film cartridges of different size types.

The second purpose of the present invention is to offer a motion picture camera whose footage counter mechanism is automatically switched over according to the change of the type of film cartridges of different film capacity so as to indicate the quantity of the particular film consumed.

The third purpose of the present invention is to offer a motion picture camera and its system whose footage counter mechanism is automatically switched over according to the change of the type of film cartridge of different film capacity so as to indicate the quantity of the particular film consumed and whose film winding up torque can also be automatically switched over.

Other purposes of the present invention will become clear from the present specification and the embodiment shown in the attached drawings.

BRIEF DESCRIPTION OF THE DRAWINGS

FIG. 1 shows the film cartridge applicable to the motion picture camera according to the present invention in perspective view, whereby FIG. 1(a) shows the film cartridge of the standard size type, while FIG. 1(b) shows the film cartridge of the long size type.

FIG. 2 shows a motion picture camera according to the present invention in perspective view in which the film cartridges of the different sizes as shown in FIG. 1(a) and FIG. 1(b) is applicable, wherein the motion picture camera is equipped with a cover 13 so that only the film cartridge of the standard size 1 as shown in FIG. 1(a) can be used.

FIG. 3 also shows a motion picture camera according to the present invention in perspective view in which the film cartridge of the different sizes as shown in FIG. 1(a) and FIG. 1(b) is applicable, wherein the motion picture camera is not equipped with the cover 13 so that only the film cartridge of the long size 4 as shown in FIG. 1(b) can be used as shown in double dotted line.

FIG. 9(a) shows the state when the cartridge 4' is loaded, while FIG. 9(b) shows the state when the cartridge 1 is loaded.

FIG. 11 shows the states seen through the window 35 from the outside of the camera when the film cartridge 1 as shown in FIG. 1(a) respectively the film cartridge of the long size type 4', 4'' as shown in FIG. 12 respectively FIG. 11(a) shows the state when the film cartridge of the long size type is loaded, while

FIG. 13 shows a film cartridge 4' as a variation of the film cartridge of the long size type 4 as shown in FIG. 1(b) in perspective view, whereby on a part of the side plate of the film cartridge a convex part 57 is provided.

DESCRIPTION OF THE PREFERRED EMBODIMENT

Figure 4:
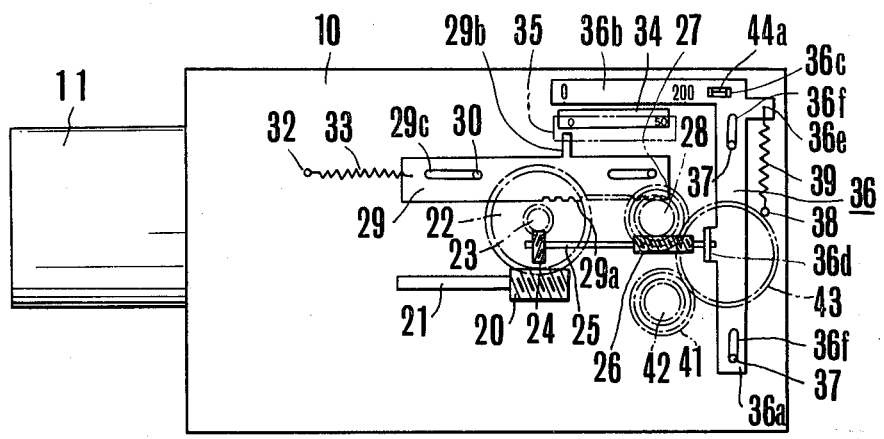
FIG. 4 shows the plan view of the first embodiment of the automatic footage counter switching over mechanism with which the footage counters can automatically be switched over according to the size of the film cartridge when the film cartridges of the different sizes are used in the motion picture camera according to the present invention, whereby the film cartridge of the standard size 1 as shwon in FIG. 1(a) is loaded.

Below, the present invention will be explained according to the drawings by reference to several preferred embodiment of the motion picture camera and its system according to the present invention in which film cartridges of different film capacities can be used selectively.

FIG. 1(a) shows the well known film cartridge 1 presenting an opening for film exposure 2 and the winding up shaft 3. FIG. 1(b) shows the film cartridge of the long size type 4 which includes an opening 5 for film exposure, a rotating shaft 6 being rotated by the rotating power from the driving device at the camera side, the part 4a to be loaded in the camera body, the winding up shaft 7 for winding up the film, the part 4b attached to the part 4a for containing film of long size type and a rotation transmitting member 8 for transmitting the driving power from the rotating shaft 6 to the winding up shaft 7 between the rotating shaft 6 and the winding up shaft 7. The opening 5 and the rotating shaft 6 for the film exposure formed at the part 4a of the film cartridge of the long size type 4 correspond to those of the film cartridge of the standard size type 1.

FIG. 2 and FIG. 3 respectively show the motion picture camera according to the present invention in perspective view in which both the film cartridge of the standard size type 1 as shown in FIG. 1(a) and the film cartridge of the long size type as shown in FIG. 1(b) can be used. In these figures, 10 is the camera body, 11 the lens barrel and 12 the cover for the film cartridge chamber enabling the film cartridge chamber 15 to respectively open and close at the side plate of the camera body and keeping the film cartridge 1 or 4 in the film cartridge chamber 15. 13 is a cover provided on the upper surface of the film cartridge chamber 15 which, by being slided along the direction of the cover 12 of the film cartridge chamber 15, is put out of the upper surface of the film cartidge chamber 15 so as to form an opening on the upper surface of the film cartridge chamber 15. The cover 13, by being slided from the cover 12 of the film cartridge chamber toward the camera, is fitted on the upper surface of the film cartridge chamber 15 so as to cover the upper surface of the film cartridge chamber 15. Further, on the cover 13 at the side facing one side of the film cartridge chamber, an abutment 14 is provided for controlling the footage counter as well as the film winding up mechanism.

The motion picture camera according to the present invention shown in FIG. 2 is in a state in which on the upper surface of the film cartridge chamber 15, the cover 13 is set, whereby the type of the film cartridge which can be used with the cover 13 thus set on the upper surface of the film cartridge chamber is that of the standard size type as shown in FIG. 1(a). When the cover 12 of the film cartridge chamber is opened while the cover 13 is set on the upper surface of the film cartridge chamber 15 and the cover 12 is closed again after the opening 25 for film exposure is set toward the side of the lens barrel 11, the motion picture camera is ready for picture taking.

The motion picture camera according to the present invention shown in FIG. 3 is in the state in which the cover 13 on the upper surface of the film cartridge chamber 15 has been put out, whereby the type of the film which can be used in the state in which the cover 13 has been put out as mentioned above is the film cartridge of the long size type 4 as shown in FIG. 1(b). When the cover 12 of the film cartridge chamber is opened while the cover 13 has been put away from the upper surface of the film cartridge chamber 15 as shown in FIG. 3, the opening 5 for film exposure is directed toward the side of the lens barrel 11 and the part 4a is set similarly to the film cartridge of the standard size type 1, the film containing part 4b is brought into a state in which the part 4b protrudes through the opening of the upper surface of the film cartridge chamber 15 as shown by the imaginary line in the drawing while the opening is completely closed by the film containing part 4b so that the motion picture camera is ready for taking photograph by closing the cover 12 of the film cartridge again in such a manner that inside of the camera the film to be exposed through the opening 5 for film exposure is influenced by other light from outside than the light beam coming from the object through the optics.

The form of the film cartridge of the standard size type 1 and that of the film cartridge of the long size type 4 as well as the loading method and the loaded state of the film cartridge of the standard size type 1 and of the film cartridge of the long size type 1 have so far been explained. Below the mechanism of the motion picture camera will be explained which can automatically be switched over to the footage counter and the winding up torque of the film winding up mechanism suited for the film cartridge according to the size of the film cartridge when the film cartridge of the standard size type respectively that of the long size type is loaded in the above mentioned motion picture camera.

Figure 5:
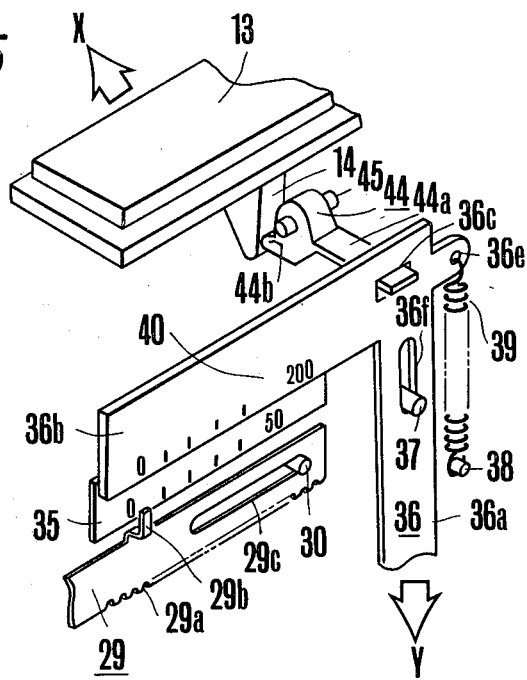
FIG. 5 shows an important part of FIG. 4 in enlargement.
Figure 6:
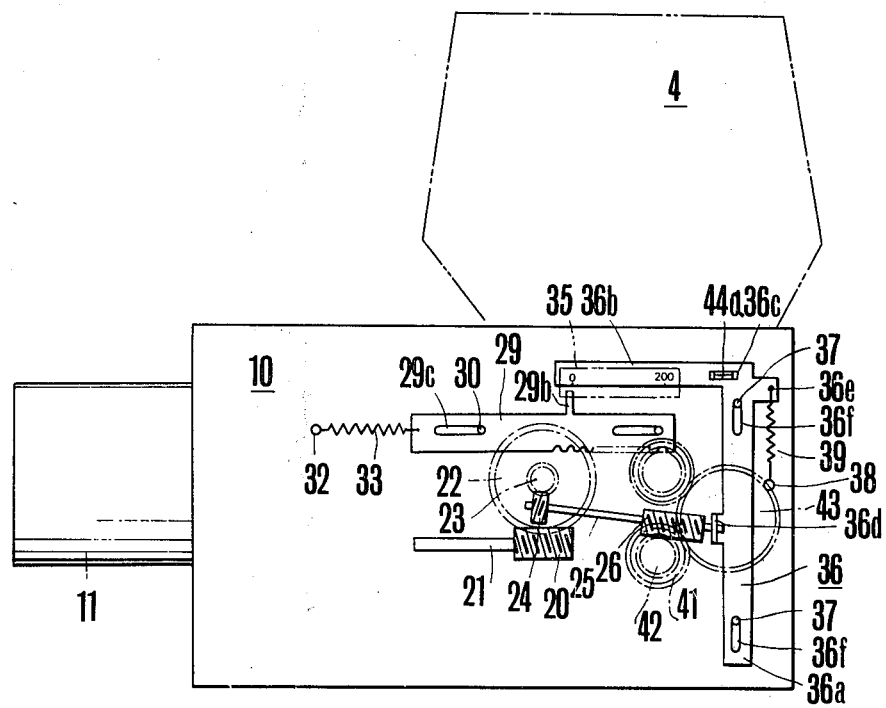
FIG. 6 shows the embodiment of FIG. 4, whereby the film cartridge of the long size 4 as shown in FIG. 1(b) is loaded.

FIG. 4, FIG. 5 and FIG. 6 show an embodiment of the automatic footage counter switching over mechanism which automatically switches over the footage counter according to the size of the film cartridge when the film cartridge of the different size type is used in the motion picture camera according to the present invention. FIG. 4 shows the state of the mechanism when the film cartridge of the standard size type 1 as shown in FIG. 1 (a) is used, while FIG. 6 shows the state of the mechanism when the film cartridge of the long size type 4 as shown in FIG. 1(b) is used.

In the drawings 21 is an already known means generally used by the expert in this technical field which rotates receiving torque from a motor, whereby the worm gear 20 is fitted on the rotating shaft 21 so as to rotate with the rotation of the above mentioned shaft 21. 22 is a gear which engages with the worm gear 20 so as to rotate receiving torque from the worm gear 20, whereby on the shaft bearing the gear 22 an already known means is provided which engages with the winding up shaft 3 respectively the rotating shaft 6 of the film cartridge 1 or 4 so as to rotate the winding up shaft 3 respectively the rotating shaft 6. The worm gear 23 is born on the same shaft on which the gear 22 is provided in such a manner that when the worm gear 23 is rotated the gear 22 also rotates. 24 is a gear which is fitted on the transmission shaft 25 and engages with the worm gear 23. The transmission shaft 25 presents a worm gear 26 beside the above mentioned gear 24 and is held rotatably by means of a supporting member (not shown in the drawing) between the gear 24 and the worm gear 26, while the end of the transmission gear 25 at the side of the worm gear 26 engages in a small hole of the curved part 36d of the movable member 36, presenting a flexibility so that the upward and downward movement of the worm gear 26 due to the movable part is possible. 41 and 42 are the gears secured on the same shaft so as to rotate in common, 27 and 28 are the gears secured also on the same shaft opposed that bearing the gears 41 and 42 so as to rotate also in common and 43 is the gear disposed so as to engage with the gears 27 and 41, whereby the gear 42 engages with the gear 28 when the above mentioned transmission shaft 25 moves the worm gear 26 upwards by means of the movable member 36 while the gear 42 engages with the gear 41 when the transmission shaft 25 moves the worm gear 26 downwards by means of the movable member 36. 29 is a movable plate presenting a rack 29a on its one portion, a long narrow projection 29b and a long hole 29c, whereby the movable plate is forced toward the lens barrel 11 by means of a spring 33 disposed between one portion of the above mentioned movable plate 29 and a pin 32 provided on the camera. The rack 29a is disposed so as to engage with the above mentioned gear 28 in such a manner that the movable plate 29 is moved sliding along the reversed direction toward the lens barrel 11 by means of the rotation of the gear 28 when the gear 28 is rotated. The long hole 29c engages with the pin 30 provided on the camera body so as to serve to guide the sliding movement of the above mentioned movable plate 29 when the movable plate 29 is moved sliding. The projection 29b serves as the pointer of the footage counter, and can be observed from outside of the camera through the window 35 provided on the camera body 10 by means of the relative position of the scale plate 34 correspondingly disposed at a proper position respectively of the scale plate portion 36b of the movable member 36 to the pointer, from which the photographer can know the quantity of the film consumed.

The above mentioned movable member 36 presents an almost L-shaped form with the control plate part 36a and the scale plate part 36b, whereby a curved portion 36d in engagement with the one end of the above mentioned transmission shaft 25, a long hole 36f and small holes 36c and 36e are provided on one part of the movable member 36. In the small hole 36c a projection piece 44a of the switching over member 44 which is born rotatably on the shaft 45 as shown in detail in FIG. 5 and presents two projection pieces 44a and 44b being prolonged along the opposite directions to each other is engaged. In the small hole 36e the one end of the spring 39, the other end of which engages with the pin 38 provided one the camera body, is engaged in such a manner that the movable member 36 is pushed downwards (along the direction of the arrow Y in FIG. 5). The pin 37 provided on the camera body engages in the long hole 36f so as to serve to guide the sliding movement of the movable member 36 when the movable member 36 is moved sliding upwards and downwards.

The above mentioned switching over means 44 is in contact with the projection 14 provided as one body on the above mentioned cover 13 when the cover 13 is provided on the camera body as is shown in FIG. 4 and FIG. 5, whereby the movable member 36 is held upwards while the projection piece 44a is also being moved anticlockwise, because the projection piece 44b is forced anticlockwise by means of the above mentioned projection 14. Because the end of the above mentioned curved portion 36d at the side of the worm gear 26 of the transmission shaft 25 in engagement in the small hole is also moved upwards when the movable member 36 is moved upwards, the scale plate portion 36b of the movable member 36 is disposed outside of the window 35 while at the same time the worm gear 26 engages with the gear 28 so that the worm gear 26 is out of the engagement with the gear 42. Hereby the scale plate 34 can be observed in the window 35 seen from outside of the camera. Namely in the above mentioned state only the film cartridge of the standard size type 1 as shown in FIG. 1(a) can be used. When thus in this state the motor (not shown in the drawing) is driven, the rotation shaft 21 is rotated receiving the torque from the motor, so that the gear 22 is rotated in such a manner that the winding up shaft 3 of the film cartridge is rotated while the torque is transmitted to the gear 28 through the worm gear 23, the gear 24, the transmission shaft 25 and the worm gear 26 and the gear 27. When in this way the gear 28 is rotated the movable plate 29 presenting the rack 29a in engagement with the above mentioned gear 28 is fed along the reversed direction toward the lens barrel 11 by the rotation of the gear 28, so that the quantity of the movement is indicated by means of the projection 29b of the movable plate 29 along the scale of the scale plate 34 disposed in the window 35 provided on the camera body.

When the above mentioned cover 13 provided on the camera body is moved along the direction X in FIG. 5 and taken away in order that the film cartridge of the long size type 4 as shown in FIG. 1(b) can be loaded, the projection piece 44b of the above mentioned switching member 44 is freed. When the projection piece 44b is freed, the movable member 36 is moved downwards while the projection piece 44a in engagement in the small hole 36c in the movable member 36 is also moved downwards clockwise by means of the downward movement of the above mentioned member 36 because the movable member 36 is forced along the direction Y by means of the spring 39. When the movable member is moved downwards the scale plate part 36b whose scale distance per unit is smaller than that of the scale of the scale plate part 34 is superposed over the scale plate 34 so that from the outside of the camera only the scale plate 36b can be observed while because the end of the curved portion 36d at the side of the worm gear 26 of the transmission shaft in engagement in the small hole of the curved portion 36d is moved downwards the worm gear 26 and the gear 28 go out of the engagement in such a manner that the worm gear 26 enter into engagement with the gear 42. When thus in this state the motor is driven the rotation shaft 21 is rotated receiving the torque from the motor, so that the gear 22 is rotated so as to rotate the rotation shaft 6 of the film cartridge 4 in such a manner that the torque is transmitted to the gear 42 through the worm gear 23, the gear 24, the transmission shaft 25 and the worm gear 26.

The rotation of the gear 42 is transmitted to the gear 43 in engagement with the gear 41 which rotates on the same shaft of the gear 42 and to the gear 28 through the gear 27 in engagement with the gear 42. Hereby the rotation speed of the gear 28 is more reduced than in the gear system as shown in FIG. 4.

When in this way the gear 28 is rotated the movable plate 29 presenting a rack 29a in engagement with the gear 28 disposed similarly to FIG. 4 is fed along the reversed direction toward the lens barrel by means of the rotation of the gear 28, so that the quantity of the movement is indicated as the quantity of the consumed film by means of the projection 29b of the movable plate 29 along the scale of the scale plate portion 36b disposed in the hole provided in the camera body.

It goes without saying that in case the film cartridge of the standard size type 1 as is shown in FIG. 1(a) is again used, the cover 13 is put on the camera body in such a manner that the switching over means 44 is rotated anticlockwise because of the pushing effect of the cover whereby the state as is shown in FIG. 4 is produced. When further the film cartridge 1 or 4 is taken out of the film cartridge chamber of the camera of the present embodiment, the movable plate 29 assume the initial position by means of an already known means, whereby the projection 29b points the O in the scale.

FIGS. 7, 8a, 8b, 9a and 9b show a variation as the second embodiment of the automatic footage counter switching over mechanism for the motion picture camera according to the present invention shown in FIGS. 4, 5 and 6, by means of which mechanism the footage counters can be switched over according to the size of the then cartridge when the film cartridges of the different size type are used. In the drawing a switching over means 44' is carried rotatably on the shaft 45', bearing two projection pieces 44'a and 44'b prolonged along the opposite direction to each other. 47 is the scale plate fixed firmly in the window 35 of the camera body 10, whereby on the scale plate 47 a scale for indication of the film footage of the film cartridge of the long size type is provided so as to be observed from the outside of the camera through the window 35. 52 is a control means born rotatably on a shaft 53. 40 is a gear rotatably and slidably born by a shaft 50, whereby the driving power is transmitted to the gear 40 for example from the motor for feeding the film when the winding up shaft of the above mentioned film cartridge is rotated. On the shaft 50 bearing the gear 40 a spring 51 is disposed between the gear 40 and the camera body 10 in such a manner that the gear 40 is forced toward the outside of the shaft 50. Hereby the movement of the gear 40 toward the outside of the shaft 50 due to the force of the spring 51 is controlled by the fact that the one end 52a of the above mentioned control member 52 is in contact with the side surface of the gear 40, whereby the gear 40 is also moved into the second position toward the inside of the shaft 50 when the above mentioned control member 52 is moved clockwise, while the gear 40 is also moved into the first position toward the outside of the shaft 50 when the above mentioned control member 52 is moved anticlockwise. 48 is a movable plate which presents a long hole 48b, a projection 48c and a small hole 48d beside a rack 48a consisting of first rack portion $48a_1$, entering into engagement the gear 40 when the gear 40 is situated in the first and the second position of the shaft 50 and of second rack portion $48a_2$ entering into engagement with the gear 40 only when the gear 40 is situated in the second position of the shaft 50. In the small hole 48d the one end of spring 50, the other end of which engages with a pin 55, is engaged in such a manner that the movable plate 48 is forced toward the side of the lens barrel now shown in the drawing. The rack 48a serves to move the movable plate 48 in the opposite direction toward the lens barrel when the gear 40 is rotated while the long hole 48b engages with the pin 49 provided on the camera body so as to serve to guide the movement of the movable plate 48. The projection 48c serves as the pointer of the footage counter and moves along the scale of the scale plate 47 when the movable plate 48 is moved by means of the gear 40 in such a manner that the projection 48c can be observed from the outside of the camera through the window 35 provided in the camera body due to the relative position of the scale plate 47 to the scale so that the photographer can know the quantity of the consumed film.

Figure 13:
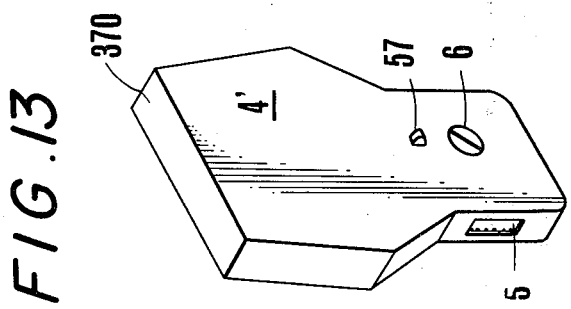
FIG. 13 is loaded in the motion picture camera having the mechanism as shown in FIG. 10.

In the present second embodiment the film cartridge of the standard size type as is shown in FIG. 1 (a) can be used while in stead of the film cartridge of the long size type as is shown in FIG. 1(b), a film cartridge 4' presenting a projection portion 57, with the same dimension as that shown in FIG. 1(b) is used as shown in FIG. 13.

Hereby the switching over means 44 born on the shaft 45' and presenting the projection pieces 44'a and 44'b has been moved clockwise when the film cartridge of the standard size type 1 is loaded, while the switching over means 44' has been moved anticlockwise because the projection piece 44'b is pushed down by means of the projection 57 of the cartridge 4' when the film cartridge of the lone size type 4' is loaded.

46 is a movable member shaped into an almost L-form with a control plate portion 46a and the scale covering plate portion 46b and presents a tapered portion 46c, long hole 46d and a small holes 46e and 46f on one portion. In a small hole 46f the one end of the spring 59a, other end of which engages with the pin 54, is engaged so as to force the movable member 46 downwards by means of the spring 59. The projection piece 44'a of the above mentioned switching over means 44' engages in the hole 46c and serves to move the movable member 46 upwards by means of the movement of the switching member 44' when the switching member 44' is moved anticlockwise. The long hole 46d, in which a pin 58 provided on the camera body engages, serves to guide the above mentioned movable member 46 when the movable member 46 is moved sliding upwards and downwards. The tapered portion 46c serves to push up the one end 52 b of the above mentioned control member 52 so as to move the above mentioned control member 52 clockwise when the movable member 46 is moved upwards, whereby the control member 52 is moved clockwise the gear 40 is moved into the second position as is shown in FIG. 8(b). The operation of the present embodiment composed as above mentioned is as follows.

Figure 8A:
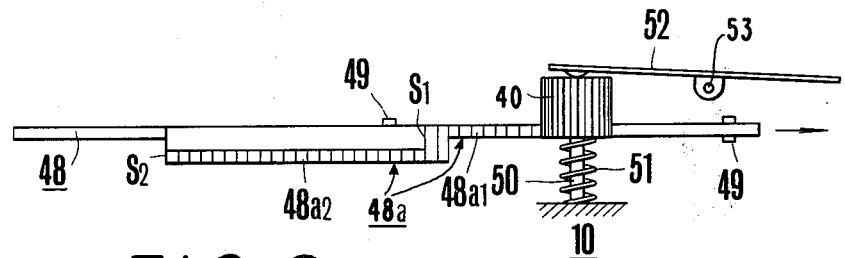
FIG. 8(a) shows the view seen according to the arrow A—A of FIG. 7, whereby the position of the gear 40 is shown when the film cartridge of the standard size type 1 as shown in FIG. 1(a) is loaded in the motion picture camera having the mechanism as shown in FIG. 7.
Figure 8B:
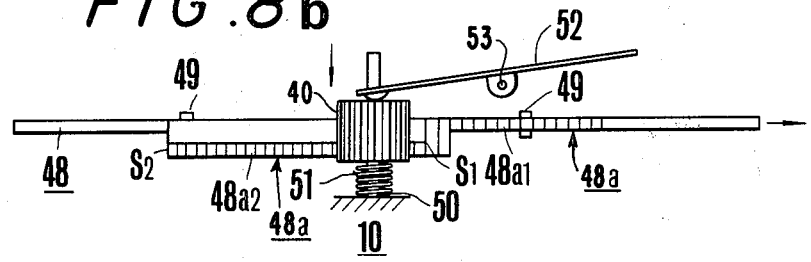
FIG. 8(b) also shows the view seen according to the arrow A—A of FIG. 7, whereby the position of the gear 28 is shown when the film cartridge of the long size type 4' as shown in FIG. 13 is loaded having the mechanism as shown in FIG. 7.
Figure 7:
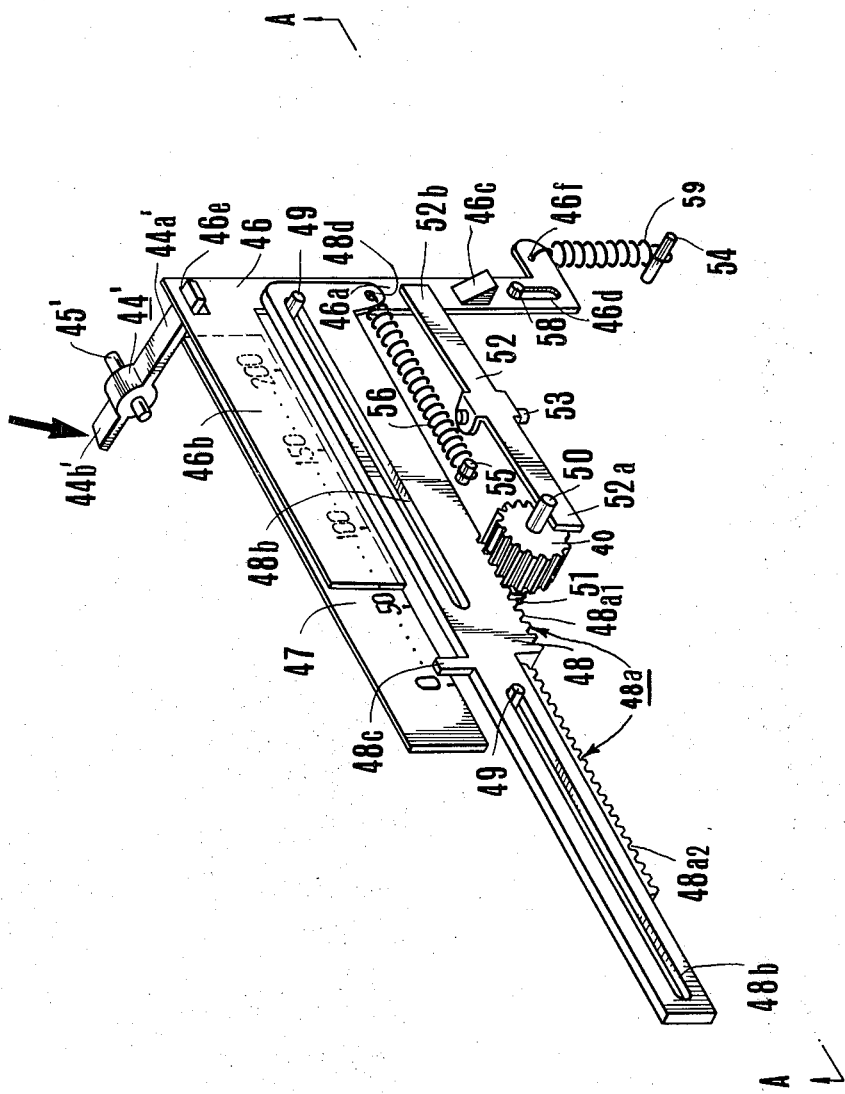
FIG. 7 shows the second embodiment of the automatic footage counter switching over mechanism for the motion picture camera according to the present invention in perspective view.
Figure 9A:
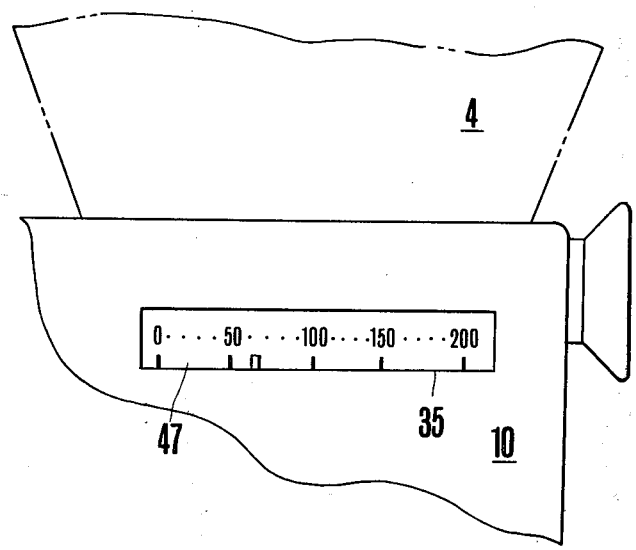
FIGS. 9(a) and 9(b) show the states seen through the window 35 from the outside of the motion picture camera when the film cartridge 1 as shown in FIG. 1(a) or the film cartridge 4' of the long size type 4' as shown in FIG. 13 is loaded in the motion picture camera having the mechanism as shown in FIG. 7.
Figure 9B:
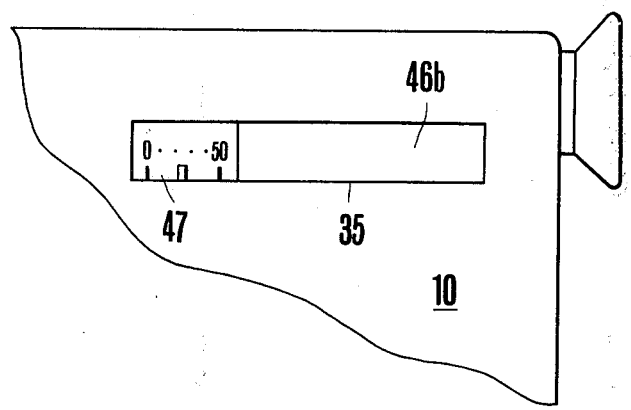

In the state as is shown in FIG. 7, FIG. 8(a) and FIG. 9(b) the film cartridge of the standard size type 1 as is shown in FIG. 1(a) is loaded, whereby the movable member 46 has been moved downwards because the switching member 44' has been moved clockwise. In this state the scale covering plate 46b of the movable member 46 covers a part of the scale part 47 so that in the window 35 of the camera body 10 only a part of the scale plate 47 appears and therefore the photographer can observe the scale of the scale plate 47 only as is shown in FIG. 9(b). Further the end 52b of the control member 52 is out of engagement with the tapered portion 46c of the movable member 46, so that the control member 52 is positioned anticlockwise due to the effect of the spring 51. Thus the gear 40 is engaged with the first rack portion 48a of the movable plate 48 in the first position.

When in the above mentioned state the gear 40 is rotated by means of a motor not shown in the drawing, the movable plate 48 is fed along the direction of the arrow in FIG. 8(a) by means of the first rack portion $48a_1$ disposed in engagement with the gear 40, whereby the quantity of the movement is indicated as the quantity of the consumed film by means of the projection 48c of the movable plate 48 along the scale plate 47 disposed in the window 35 provided on the camera body. When reaches the end position $S_1$ of the rack $48a_1$ reaches the gear 40, so that the gear is out of engagement with the first portion $48a_1$ rack and therefore the movable plate 48 is not moved any more. In short, the projection 48c of the movable plate 48 which reaches the end position of the scale plate 47 does not produced any more, stopping at the position.

When the film cartridge of the long size type 4' as is shown in FIG. 13 is loaded the projection piece 44'b of the switching means 44' is pushed by means of the projection 57 provided on the cartridge 4' so that the switching means 44' is moved anticlockwise in such a manner that the movable member 46 is moved upwards. When the movable member 46 is moved upwards the scale covering plate 46b disposed in the window 35 provided on the camera body and covering a part of the scale plate 47 goes out of the disposition in the window 35, so that the whole scale of the scale plate 47 appears in the window 35 as is shown in FIG. 9(a).

When further the movable member 46 is moved upwards the tapered portion 46c of the movable member 46 pushes up the one end 52b of the control member 52 so that the control member 52 is rotated clockwise. When the control member 52 is rotated clockwise the other end 52a of the control member 52 moves the gear 40 into the second position as is shown in FIG. 8(b) against the effect of the spring 51.

When in this state, the gear 40 is rotated by means of a motor not shown in the drawing, the movable plate 48 is fed along the direction of the arrow in FIG. 8(b) by means of the operation of the first rack portion $48a_1$ 48a disposed in engagement with the gear 40, in such a manner that the quantity of the movement is indicated as the quantity of the consumed film by means of the projection 48c of the movable plate 48 along the scale of the scale plate 47 disposed in the window 35 provided in the camera body. When thus the end position $S_1$ of the first rack portion $48a_1$ reaches the gear 40, the gear 40 then engages with the second rack portion $48a_2$ so as to continue to feed the movable plate 48 because the gear 40 is positioned in the second position II. When the end position $S_2$ of the second rack portion $48a_2$, reaches the gear 40 the gear 40 goes out of the engagement with the rack $48a_2$ at the end position $S_2$, rotating thus in vain so that the movable plate 48 is not moved any more. Thus the projection 48c of the movable plate 48 which has reached the end position of the scale plate 47 does not advance any more, being kept at the position.

When the film cartridge of the long size type 4' is taken out in order to use the film cartridge of the standard size again as is shown in FIG. 1(a) the pressure of the projection piece 44'b of the switching member 44' due to the projection 57 of the above mentioned film cartridge 4' is resolved so that due to the effect of the spring 59 the movable member 46 assumes the lower position as is shown in FIG. 7. In this way the film cartridge of the standard size type 1 can be used again. When further in the present embodiment the film cartridge 1 or 4' is taken out the cartridge chamber in the camera body, the movable plate 47 assumes the initial position by means of an already known means in such a manner that the projection 48c points the position O of the scale plate 47.

Figure 10:
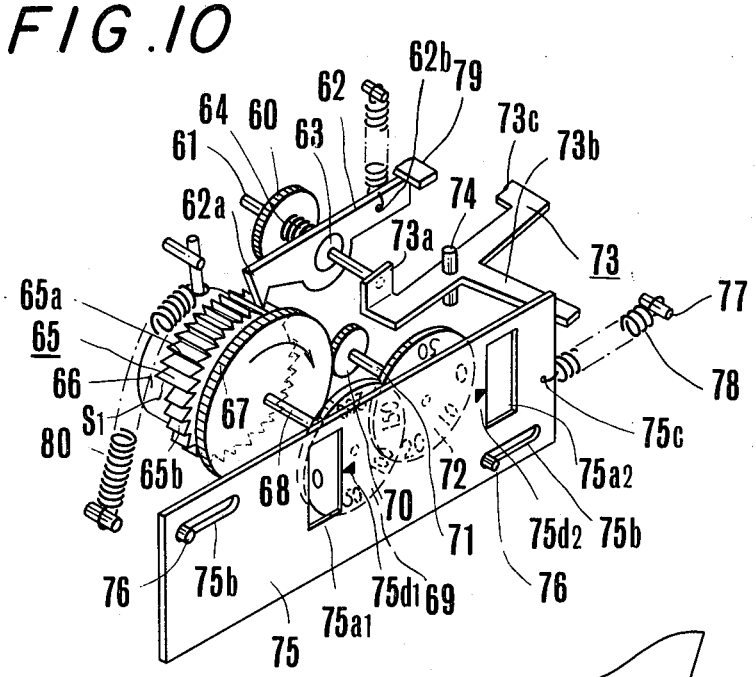
FIG. 10 shows the third embodiment of the automatic footage counter switching over mechanism for the motion picture camera according to the present invention in perspective view.

FIG. 10 shows the third embodiment as further another variation of the footage counter switching over mechanism for the motion picture camera according to the present invention, whereby in the drawing 60 is a gear fitted on the shaft 61 slidable along the axial direction and 62 the feeding claw member which is fitted on the excentric member 63 born slidably on the above mentioned shaft 61, prolonged toward both sides of the excentric member 63 and presents the feeding claw 62a at the one end and the small hole 62b at the other end. On the shaft 61 a spring 64 is disposed between the gear 60 and the excentric member 63 in such a manner that the above mentioned spring 64 forces the excentric member 63 in the axial direction and transmitts the torque of the gear 64 to the excentric member 63 through the slip torque. 65 is a ratchet wheel fitted on the shaft 66 and presenting a wide ratchet portion 65a and a narrow ratchet portion 65b adjacent to the wide ratchet portion 65a. The ratchet portion 65b is provided almost whole the circumference of the ratchet wheel 65 along the rotation direction starting from the ratchet portion 65a, whereby at the end of the prolongation a notch is provided in such a manner that the feed claw 62 does not rotate the ratchet wheel without limitation. 67 is a flat gear which rotates with the ratchet wheel 65 as one body, 69 is a first scale disc fitted on the shaft 68 which rotates with the flat gear 67 whereby the scale disc 69 rotates only with the rotation angle of the flat gear 67. 70 is a flat gear born on the shaft 71, disposed so as to engage with the gear 67 and presenting a smaller number of the teeth than that of the gear 67. 72 is a second scale disc being rotated with the rotation angle of the gear 70 fitted on the shaft 71 in cooperation with the gear 70 and presents numerical figures indicating shorter length for the rotation angle of the scale disc 69. 75 is a movable plate disposed in the window 35 in the camera body so as to cover the scale disc 69 respectively 72, whereby the above mentioned movable plate 75 is movable sliding right and left in the lengthwise direction by means of the rotation of the movable member 73 as explained later, while the plate 75 presents two openings $75a_1$ and $75a_2$, a long hole 75b and a small hole 75c on the one portion. When the movable plate 75 is moved to the right the opening $75a_1$ is disposed on the scale disc 69 in such a manner that only one part of the scale of the disc 69 can be observed from outside of the camera through the window 35, while when the movable plate 75 is moved to the left the opening $75a_2$ is disposed on the scale disc 72 in such a manner that only one part of the scale of the disc 72 can be observed from outside of the camera through the window 35. When the one of the openings $75a_1$ and $75a_2$ is disposed on the corresponding scale disc the other opening is disposed outside of the window so that only the scale of the scale disc corresponding to the opening disposed in the window 35 can be observed from outside of the camera through the window 35. In the neighborhood of the opening $75a_1$, $75a_2$ the index $75d_1$ respectively $75d_2$ is disposed in such a manner that the quantity of the used film can be indicated by means of the scale provided on the scale discs and the above mentioned index. The long hole 75b in which the pin 76 provided on the camera body serves to guide the sliding movement of the above mentioned movable plate 75. In the small hole 75c the one end of the spring 78, the other end of which engages with the pin provided on the camera body, is engaged in such a manner that the spring forces the above mentioned movable plate 75 to the right position. 73 is the movable member which rotates around the shaft as center according to the kind of the film cartridge, whereby the movable member 73 presents a projection piece 73a which can move the shaft bearing the feeding member 62 sliding along the axial direction, a projection piece 73b which causes to move the movable plate 75 to the left direction and a projection pieces 73c which rotates the movable member 73, receiving the information concerning to the kind of the film cartridge. The projection piece 73c of the movable member 73 shown in FIG. 10 receives the information concerning the kind of the loaded cartridge and rotates the movable member 73 along the clockwise direction when the film cartridge of the standard size type is loaded, while the projection piece 73c also receives the information of the loaded cartridge and holds the movable member 73 along the anticlockwise direction as is shown in FIG. 10 when the film cartridge of the long size type is loaded.

When therefore in the motion picture camera presenting the thus composed footage counter mechanism the film cartridge of the long size type is loaded, the movable member 73 is positioned clockwise as is shown in FIG. 10, so that the movable plate 75 is positioned to the right where the opening 75a is positioned on the scale disc 69, while the shaft 61 is positioned outside of the camera, namely toward the scale disc in such a manner that the feeding claw member is also positioned on the ratchet wheel outside of the camera.

Figure 11A:
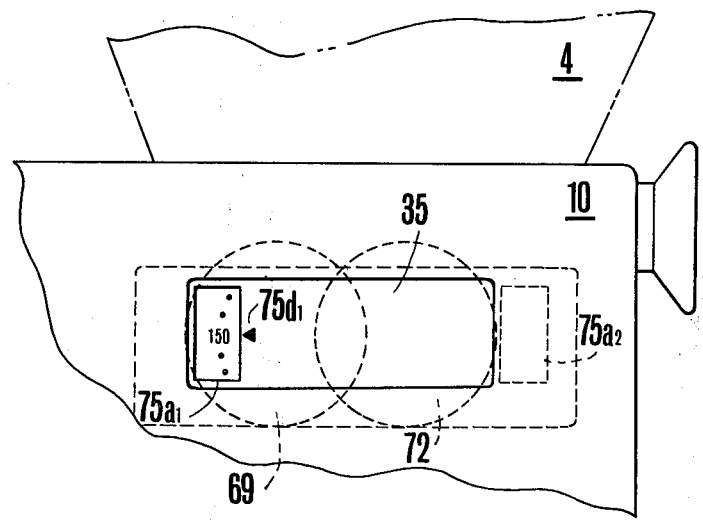

When in the above mentioned state the gear 60 is rotated receiving torque from a motor not shown in the drawing, the torque of the above mentioned gear 60 is transmitted to the feeding claw member 62 through the shaft in such a manner that the ratchet wheel 65 is rotated along the direction of the arrow in the drawing by means of the feeding claw 62a. When the ratchet wheel 65 is rotated the shaft 68 bearing the above mentioned ratchet wheel 65 is also rotated together with the ratchet wheel 65 in such a manner that the scale disc 69 is also rotated together with the ratchet wheel 65 starting from the scale O corresponding to the index $75d_1$ of the movable plate 75. The scale disc 69 is therefore rotated with the angle which corresponds to the angle of rotation of the ratchet wheel 65 in such a manner that the quantity of movement is indicated to the photographer as the quantity of the film consumed through the window 35 from the outside of the camera as is shown in FIG. 11(a), by corresponding to the index $75d_1$ on the movable plate 75 provided on the scale disc 69. Further the ratchet wheel 65 is provided with a notch in order that the feeding claw member 62 does not feed the ratchet wheel any more after the film contained in the film cartridge of the long size type is all consumed, so that when the point $S_2$ is reached the feeding claw 62a of the feeding claw member runs in vain and the ratchet wheel 65 is not rotated any more.

When the reset member 79 is moved downwards by an already known means after all the film is photographed in this way, the feeding claw member 62 is rotated clockwise in such a manner that the engagement of the ratchet wheel 65 with the feeding claw 62a of the feeding claw member 62 is resolved. When the engagement of the ratchet wheel 65 with the feeding claw 62a is solved, the spring for resetting 80 rotates the ratchet wheel 65 anticlockwise until the scale O of the scale plate 69 corresponds to the index 75$d_1$ of the movable plate 75.

When the film cartridge of the standard size type is loaded next, the movable member 73 is positioned clockwise opposite to the position of the movable member 73 shown in FIG. 10. When the movable member 73 is positioned clockwise the movable plate 75 is positioned to the right by means of the projection piece 73$b$ in such a manner that the opening 75$a_2$ is situated on the scale disc 72, while the shaft is also positioned inside of the camera namely along the direction opposite to the scale disc by means of the projection piece 73$a$ in such a manner that the feeding member 62 is also positioned on the ratchet wheel 65 inside of the camera.

Figure 11B:
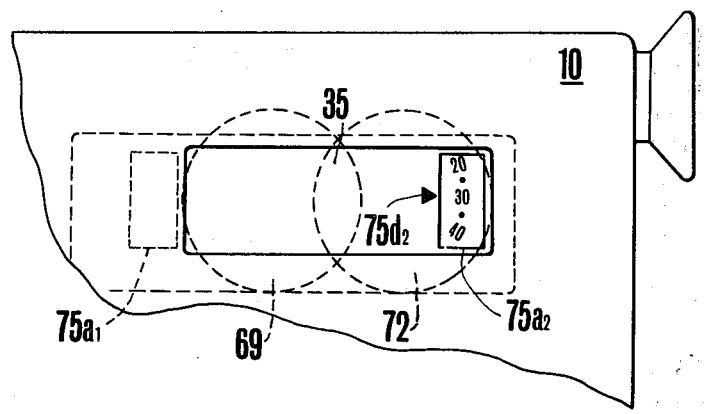
FIG. 11(b) shows the state when the film cartridge of the standard size type is loaded.

When in this state the gear 60 is rotated by means of a motor not shown in the drawing, the torque of the gear 60 is transmitted to the feeding claw member 62 through the shaft 61 in such a manner that the ratchet wheel 65 is rotated clockwise by means of the feeding claw 62$a$. When the ratchet wheel 65 is rotated the scale disc 72 rotates together with the ratchet wheel 65 starting from the scale O corresponding to the index 75$d_2$ of the movable plate 75 at a speed smaller than that of the scale disc 69 through the gear 76 rotating with the ratchet wheel as one body and the gear 70 for reducing the rotation speed of the gear 67. Thus the rotation of the scale disc 72 corresponding to the increased quantity corresponding to the rotation angle of the ratchet wheel 65 so that the quantity of rotation is indicated visually to the photographer as the quantity of the consumed film through the window 35 from the outside of the camera as is shown in FIG. 11($b$) by corresponding to the index 75$d_2$ on the movable plate 75 on the scale disc 72. Hereby the ratchet portion of the ratchet wheel 65 is shorter in its inside than in its outside whereby the inside ratchet portion is formed only up to the position $S_1$ so that when the feeding claw 62$a$ of the feeding claw 62 reaches the end position $S_1$ of the wide ratchet portion 65$a$ of the ratchet wheel 65 the feeding claw 62$a$ runs in vain and the ratchet wheel is not rotated any more. Namely the rotation angle of the ratchet wheel is smaller than in case the film cartridge of the long size type is loaded. However the rotation of the scale disc 72 is increased by means of the gears 67 and 70 so that when the feeding claw 62$a$ has reached the position $S_1$ of the ratchet wheel the scale disc 72 almost finishes one rotation in such a manner that the whole film of the standard size type is just finished.

When the resetting member 79 is moved downwards by an already known means after the whole film is photographed, the engagement of the ratchet wheel 65 with the feeding claw 62$a$ is solved as is the case with the film cartridge of the long size type so that the spring for resetting 80 rotates the ratchet wheel 65 anticlockwise until the scale O of the scale plate 72 corresponds to the index 75$d_2$ of the movable plate 75. When further the film cartridge of the standard size type is taken out of the film cartridge chamber, the state as is shown in FIG. 10 is automatically reproduced.

As explained above the motion picture camera according to the present invention contains in itself footage counters which can automatically exchanged when film cartridge of different kinds of size are loaded so that not only the operation is easy and stable but also the quantity of the film consumed is indicated correctly to the photographer when film cartridge of different kinds are used in turn in such a manner that it can completely be avoided to loose the photographing chance by misunderstanding the quantity of the film consumed, whereby it is very reliable and profitable because the automatic switching over is carried out by exchanging the film cartridges.

According to the embodiments shown in FIGS. 4 to 11 a mechanism with which the footage counter is switched over so as to be fitted to the size of the film cartridge by means of the switching over member when the film cartridges of different kinds of size are loaded, whereby it is also possible to switch over automatically not only the footage counter but also the winding up torque of the film winding up mechanism so as to be fitted to the size of the film cartridge when the film cartridges of different sizes are loaded. Below the mechanism will be explained according to the embodiment shown in FIG. 14.

Figure 14:
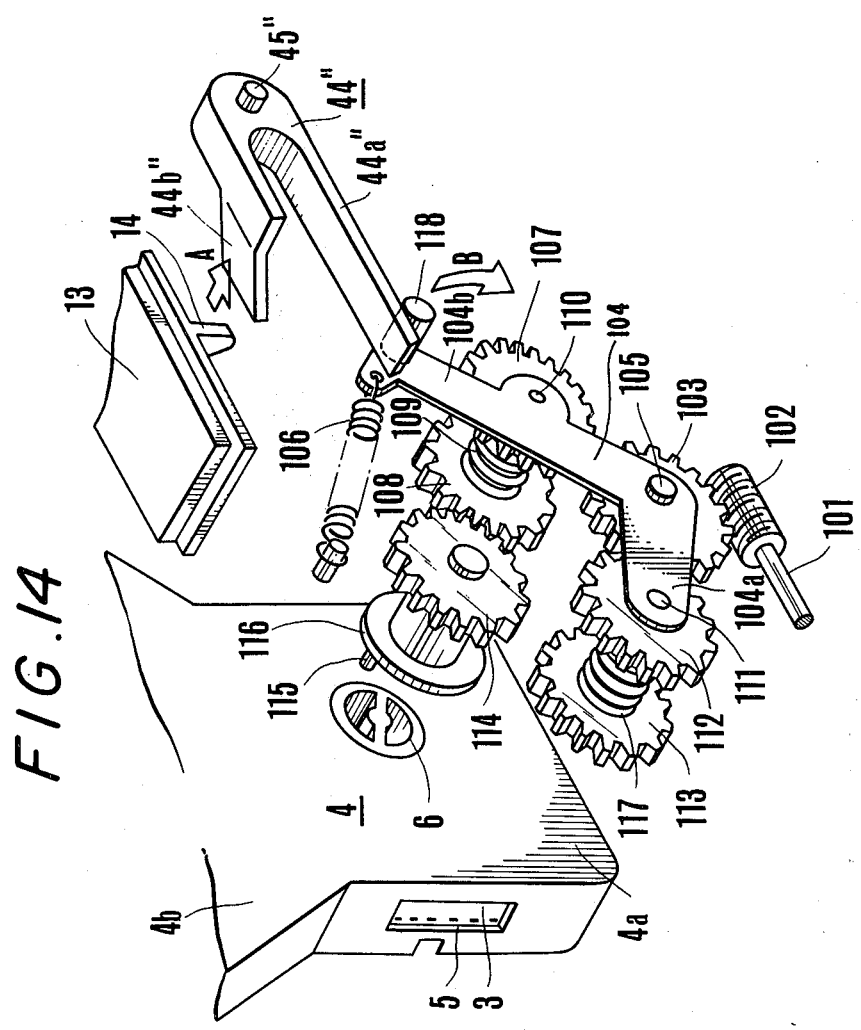
FIG. 14 shows the fourth embodiment of the automatic footage counter switching over mechanism for the motion picture camera according to the present invention in perspective view, whereby the automatic footage counter switching over mechanism is applied for the film winding up mechanism.

In FIG. 14, 101 is a shaft to be rotated by means of a film driving mechanism not shown in the drawing, whereby the shaft 101 presents at its one end a worm gear 102, which always engages with the flat gear 103. 104 is a rotary plate which is rotatably born on the central shaft 105 of the flat gear 103 and always forced anticlockwise by means of a spring 106. 107 and 108 are the flat gears which are connected with each other by means of the first friction mechanism presenting a spring 109 and boon on the rotary plate 104 by means of the shaft 110, whereby further the flat gear 107 is so arranged as to be always in engagement with the flat gear 103. On the shaft 111 on the one arm 104$a$ of the rotary plate 104 a flat gear 112 always in engagement with the flat gear 103 is provided, whereby the flat gear 112 is connected with the flat gear 113 by means of the second friction mechanism presenting a spring 117.

The flat gear 114 is rotatable as one body with the disc 116 presenting at the one end a winding up pin 115 in engagement with the winding up shafts 3, 6 of the film cartridges 1, 4 and is so designed as to engage with the flat gear 108 or 113 selectively. In the state shown in FIG. 14, the flat gear 114 is in engagement with the flat gear 108. Further it is so designed that the slip torque of the first friction mechanism is larger than the second friction mechanism. 44' is a switching over member which presents a projection piece 44''$b$ in engagement with the projection 14 provided on the dismountable cover 13 of the film chamber of the camera and a projection piece 44''$a$ disposed so as to engage with the pin 118 provided at the one end 104$b$ of the rotary plate 104, whereby the switching over member 44' is rotatably born on the shaft 45''. FIG. 14 shows the state in which the film cartridge of the long size type 4 as is shown in FIG. 1($b$) is loaded. In this state the above mentioned dismountable cover 13 of the film chamber has been taken out of the camera body, whereby the projection 14 of the cover 13 of the film chamber is apart from the switching over member 44' in such a manner that the rotary plate 104 is disposed at the position shown in FIG. 14 by means of the spring 106. Therefore the flat gear 108 has entered into engagement with the flat gear 114 in such a manner that the rotation of the winding up shaft 6 of the film cartridge 4 is transmitted from the worm gear 102 to the flat gear 114 by means of the first friction mechanism presenting a large slip torque through the flat gears 103 and 107. When now the dismountable cover 13 of the film chamber is set on the camera body as is shown in FIG. 3 in order to switch over the above mentioned state so as to be fitted to the film cartridge of the standard size type 1 as is shown in FIG. 1(a), the switching over member 44'' is pushed by means of the projection 14 along the direction of the arrow A in the drawing in such a manner that the shaft is rotated anticlockwise. In this way the other end 44''a of the switching member 44 pushes the pin 118 on the rotary plate 104 along the arrow B in the drawing. Thus the rotary plate 104 is rotated clockwise in such a manner that the engagement of the flat gear 108 with the flat gear 114 is solved while the flat gear 114 enters into engagement with the flat gear 113. Thus the friction mechanism is automatically switched over from the first friction mechanism presenting the spring 109 to the second mechanism presenting the spring 117 so as to be fitted to the film cartridge 1 as is shown in FIG. 1 which only needs a small winding up torque.

As explained above the present invention relates to a switching over mechanism of the winding up torque for a motion picture camera which permits a means to switch over the winding up torque of the winding up mechanism so as to be fitted to the size of the film cartridge whereby the camera can be used for more than two kinds of the film cartridges with different capacity for film but identical corelation between the opening for exposure and the winding up shaft, so that it is possible to switch over the film winding up torque at the camera side according to the alteration of the size of the film cartridge, which is very profitable in many respect.

Figures 15, 16:
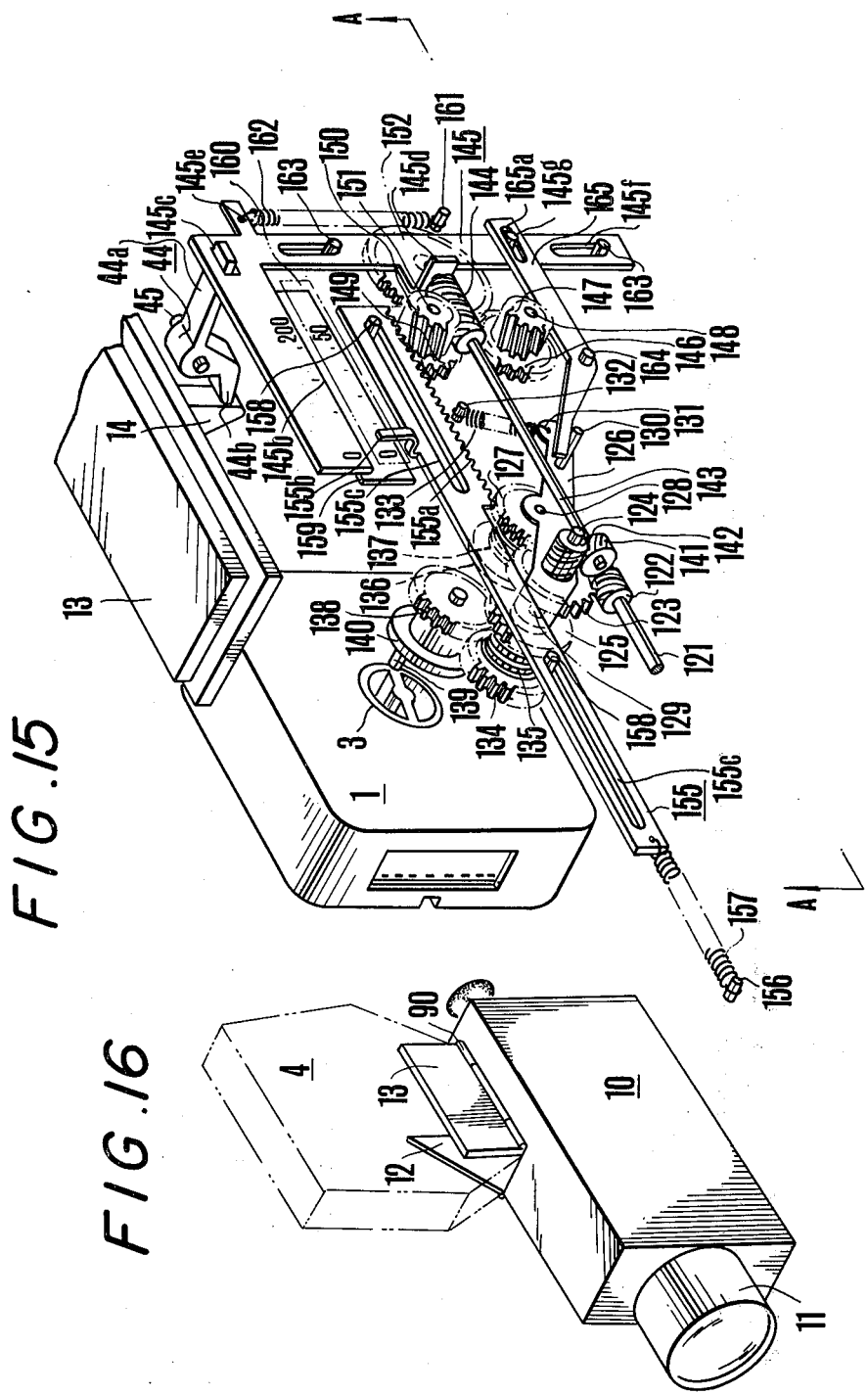
FIG. 15 shows the fifth embodiment in perspective view in which the footage counter and the winding up torque of the film winding up mechanism can be at the same time switched over in the motion picture camera.
FIG. 16 shows a variation of the cover 13 for the motion picture camera according to the present invention in perspective view.

FIGS. 2 to 14 refer to the embodiments in which either the footage counter or the winding up torque of the film winding up mechanism can automatically switched over according to the size of the then loaded film cartridge by means of the switching over member when the film cartridge of the standard size type respectively of the long size type is loaded, while FIG. 15 refers to the other embodiment in which the footage counter and the winding up torque of the film winding up mechanism are automatically at the same time switched over. In the drawing, the film cartridge to be used is same as that shown in FIG. 1, the cover 13 and the switching over member 44 are also same as those shown in FIGS. 4 to 6, whereby their operation is also same. 121 is an already known means commonly used by the expect in this field of technics and rotated receiving a torque from a motor or the like, while the worm gear 122 is fitted on the rotating shaft 121 so as to be rotated in cooperation with the rotation of the rotating shaft 121. 123 is a gear which is so arranged as to engage with the worm gear 122 and rotated receiving a torque from the worm gear 122, whereby on the shaft 124 bearing the gear 123 the worm gear 142 is fitted and the rotary plate 126 is born rotatably. On the rotary plate 126 rotatably born on the shaft 124 bearing the gear 123 the shafts 128 and 129 are provided on both sides of the shaft 124 together with the pin 130 and a small hole 131, whereby by means of the spring 133 provided between the small hole 131 and a pin 132 disposed on the camera body the rotary plate 126 is forced anticlockwise. On the shaft 128 provided on the above mentioned rotary plate 126 a gear 127 always in engagement with the gear 123 is fitted together with the gear 136, whereby the gears 127 and 136 are connected with each other by means of the first friction mechanism pressing the spring 137. On the shaft 129 disposed on the rotary plate 126 the gear 125 always in engagement with the gear 123 is fitted together with the gear 134, whereby the gears 125 and 134 is connected with each other by means of the second friction mechanism consisting of the spring 135.

The gear 138 which can be rotated as one body with the disc 140 presenting at the one end a winding up pin 139 in engagement with the winding up shaft 3 respectively the rotary shaft 6 of the film cartridge as is shown in FIGS. 1 and 2 is engaged with the gear 134 or 136 selectively when the rotary plate 104 is rotated by the means to be explained later.

141 is a gear which is fitted on the transmission shaft 143 and arranged so as to engage with the worm gear 142. The transmission shaft 143 presents a worm gear beside the above mentioned gear 141 in such a manner that the transmission shaft 143 is held rotatably by means of a support member not shown in the drawing between the gear 141 and the worm gear 144 while the end of the transmission shaft 143 at the side of the worm gear 144 engages in a small hole in the curved portion 145d of the movable member 145 in such a manner that by means of the movable member 145 to be explained later the above mentioned worm gear 144 is movable upwards and downwards. 146 and 147 are the gears which are born on a common shaft 148 so as to rotate in cooperation with each other, 149 and 150 are the gears which are born on a common shaft 151 disposed at a position opposite to the shaft 148 bearing the gears 146 and 147 so as to rotate in cooperation with each other and 152 is the gear which is so disposed as to engage with the gears 149 and 146 whereby the gear 152 engages with the gear 150 when the above mentioned transmission shaft 143 moves the worm gear 144 upwards by means of the movable member 145 while the gear 152 engages with the gear 147 when the above mentioned transmission shaft 143 moves the worm gear 144 downwards by means of the movable member 145. 155 is the movable plate which presents a rack 155a, a long narrow projection 155b and a long hole 155c and is forced toward the lens barrel not shown in the drawing by means of a spring 157 disposed between a part of the movable plate 155 and the pin 156 provided on the camera. The above mentioned rack 155a is so disposed as to engage with the above mentioned gear 149 in such a manner that when the gear 149 is rotated the rack 155a moves the movable plate 155 along the opposite direction to the lens barrel 11. The long hole 155c engages with the pin 158 provided on the camera body so as to serve to guide the slide motion of the movable plate 155. The projection 155b serves as the pointer of the footage counter and can be observed through the window 160 provided on the camera body from outside whereby the photographer can judge the quantity of the film consumed from the relative position of the pointer 155b to the scale plate 159 disposed at a proper position respectively to the scale plate portion 145b of the moveable member 145.

The above mentioned movable member 145 is shaped almost in L-form together with the control plate portion 145a and the scale portion 145b and presents a curved portion 145d in engagement with the one end of the above mentioned transmission shaft 143, a long hole 145f, a small holes 145c and 145e and a pin 145g. In the small hole 145c the projection piece 44a of the switching over member 44 rotatably born on the shaft and presenting two projection pieces 44a and 44b being extended along the opposite direction to each other is engaged. Between the small hole 145e and the pin 161 provided on the camera body a spring 162 is provided so as to force the movable member 145. In the long hole 145f a pin 163 provided on the camera body is engaged so as to serve to guide the slide motion of the above mentioned movable member 145 when the movable member 145 is moved upwards and downwards. The pin 145g is born on the shaft 164 rotatably pivoted on the camera body, in contact with the one end with the pin 130 provided on the rotary plate 126 and engages with the other end in the long hole 165a at the one end of the rotary plate controlling member 165, in such a manner that when the movable member 145 is moved downwards the controlling member 165 is rotated clockwise and when the movable member 145 is moved upwards the controlling member 165 is rotated anticlockwise until it is held at the position shown in FIG. 14.

The above mentioned switching over member 44 is in contact with the projection 14 provided as one body on the cover 13 when the cover 13 is mounted on the camera body as is shown in FIG. 14 whereby by means of the projection 14 the projection piece 44b is forced anticlockwise, so that the movable member 145 is kept upwards while the projection piece 44a is also moved anticlockwise. When the above mentioned movable member 145 is thus moved upwards the end of the transmission shaft 143 engaging in the small hole in the curved portion 145d at the side of the worm gear 144 is also moved upwards so that the scale plate portion 145b of the movable member 145 is disposed outside of the window 160 while the worm gear 144 is in engagement with the gear 150 but out of engagement with the gear 147. Hereby the scale plate 159 can be observed in the window from the outside of the camera body.

When further the above mentioned movable member 145 is moved upwards the one end of the rotary plate controlling member 165 in the long hole 165 of which the pin 145g of the movable member 145 engages is contact with the pin 130 of the rotary plate 126 so as to rotate the rotary plate 126 around the shaft 124 clockwise in such a manner that the gear 134 enters into engagement with the gear 138.

When in this state a motor not shown in the drawing is driven the rotating shaft 121 is rotated receiving torque from the motor so as to rotate the gear 122 and then the gear 123. When the gear 123 is rotated the worm gear 142 is also rotated in cooperation with the gear 123 at the same time. The rotation of the gear 123 is transmitted at the same time to the gear 125, whose rotation is further transmitted to the gear 134 by means of the second friction mechanism consisting of the spring 135 presenting a small slip torque than the first friction mechanism consisting of the spring 137 in such a manner that the gear 138 is further rotated so as to rotate the winding up shaft 3 of the film cartridge 1. On the other hand the rotation of the worm gear 142 is transmitted to the gear 141, the transmission shaft 143, the worm gear 144 and the gear 150. When the gear 150 is rotated the movable plate 155 presenting a rack 155a in engagement with the gear 150 is fed along the opposite direction of the lens in such a manner that the quantity of the movement is indicated as the quantity of the film consumed by means of the projection 155b on the movable plate 155 along the scale of the scale plate 159 disposed in the window 160 provided on the camera body. So far is the explanation for the case when the film cartridge of the standard size type 1 as is shown in FIG. 1(a) is loaded.

When then the above mentioned cover 13 mounted on the camera body is taken out in order to load the film cartridge of the long size type as in shown in FIG. 1(b), the projection piece 44b of the above mentioned switching over member 44 is freed. When the projection piece 44b is freed the movable member 145 is moved downwards because the movable member 145 is forced downwards by means of the spring 162 whereby the projection piece 44a engaging in the small hole 145c of the movable member 145 is moved clockwise and downwards according to the downward movement of the above mentioned movable member 145. When the movable member is moved downwards, on the scale plate 159 the scale plate portion 145 with the scale presenting a narrower interval per unit than the scale on the scale plate disposed outside of the window 160 provided on the camera body is superposed in such a manner only the scale plate portion 145b can be observed from outside of the camera while the end of the transmission shaft 143 engaging in a small hole of the curved portion 145d at the side of the worm gear 144 is moved downwards so that the engagement of the worm gear 144 with the gear 150 is solved in such a manner that the worm gear 144 enters into engagement with the gear 147. When the movable member 145 is moved downwards the pin 145g is also moved downwards in such a manner that the rotary plate controlling member 165 presenting a long hole 165 in which the pin 145g is engaging is rotated anticlockwise. When the rotary plate controlling member 165 is rotated clockwise the rotary plate 126 is rotated anticlockwise by means of the spring 133 whereby the engagement of the gear 134 with the gear 138 is solved while the gear 136 enters into the engagement with the gear 138.

When in this state a motor not shown in the drawing is driven the gear 123 and the worm gear 142 are rotated similarly to the above mentioned case. At the same time the rotation of the gear 123 is transmitted to the gear 127 whose rotation is further transmitted to the gear 136 by means of the first friction mechanism consisting of the spring 137 and presenting a large slip torque than the second friction mechanism consisting of a spring 135, whereby the rotating shaft of the film cartridge 4 is rotated with a larger torque than in case of the gear 134, On the other hand, the rotation of the worm gear is transmitted to the gear 141, the transmission shaft 143, the worm gear 144 and the gear 147. The rotation of the gear 147 is transmitted to the gear 152 in engagement with the gear 146 which is rotated on the same shaft 148 in cooperation with the gear 147 and then to the gear 150 by means of the gear in engagement with the gear 152. The then rotation speed of the gear 150 is reduced as compared with the case the gear 150 is directly rotated by means of the worm gear.

When in this way the gear 150 is rotated the movable plate 155 presenting a rack 155a is disposed so as to engage with the above mentioned gear 150 is fed along the opposite direction to the lens barrel according to the rotation of the gear 150 similarly to the case when the film cartridge of the standard size type 1 is loaded in such a manner that the quantity of the movement is indicated as the quantity of the film consumed to the photographer by means of the projection 155b of the movable plate 155 along the scale of the scale plate portion disposed in the window 160 provided on the camera body.

When the film cartridge of the standard size type 1 as is shown in FIG. 1(a) is to be loaded, the cover 13 is mounted on the camera body whereby the switching over means 44 is rotated anticlockwise by the pressure of the cover 13 until the state as is shown in FIG. 14 is reproduced. When the film cartridge is taken out of the film cartridge chamber in the camera body, the movable plate 155 is returned into the initial position by an already known means until the projection 155b points the scale O.

As explained above in case of the motion picture camera according to the present invention more than two kinds of the size of the film cartridge being capable of different length of film and presenting the identical corelation between the opening for exposure and the winding up shaft can be loaded, while the footage counter and the winding up torque of the film winding up mechanism can automatically be switched over so as to be fitted to the size of the film cartridge in functional engagement with the exchange of different size of the film cartridge, so that the photographer can recognize the quantity of the film consumed exactly at the time of exchanging different kinds of film cartridge in such a manner that it can completely avoided for the photographer to loose the photographing chance by misunderstanding the quantity of the film consumed, while on the other hand the switching over is automatically carried out at the exchange of the film cartridges without any complicated operation, which is very reliable and effective.

Although in case of all the embodiments explained so far the information as to the kind of the film cartridge is given to the camera by mounting and dismounting the cover 13 of the film cartridge chamber, the present invention is not always limited to such operation of the cover 13, whereby as is shown in FIG. 16 it is also possible to arrange the cover 13 swingable by means of the camera body 10 and the hinge 90 and to obtain the information from the opening and the closing of the cover 13.

Figure 12:
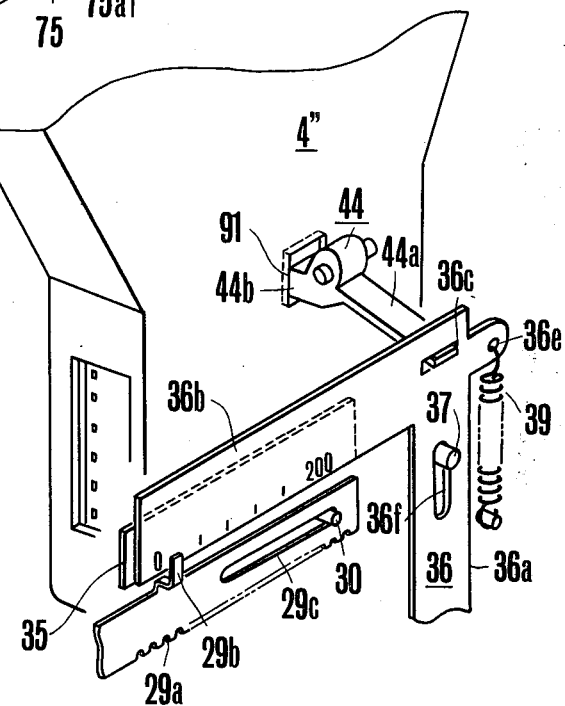
FIG. 12 shows the state in which a part of the automatic footage counter switching over mechanism according to the present invention engages with the film cartridge 4'' as a variation of the film cartridge of the long size type 4' as shown in FIG. 1(b) in perspective view, whereby on one part of the side plate a concave part 91 is provided.

Further in case of the first embodiment shown in FIG. 4, the third embodiment shown in FIG. 10 and the fourth embodiment shown in FIG. 14 the information as to the kind of the film cartridge is given to the camera by means of the projection 14 for control provide as one body with the cover of the film cartridge chamber while in case of the second embodiment shown in FIG. 7 the film cartridge 4' presenting a projection 57 is used or as is shown in FIG. 12 the film carttidge 4'' presenting a concave portion 91 is used in such a manner that the same effect as the above mentioned embodiment is realized by engaging the projection or the concave portion with a part of the mechanism according to the present invention.

What is claimed is:

1. A camera, adapted for use with different types of film cartridges containing films of different lengths, in separate occasions as desired, comprising:
   a housing containing a cartridge housing chamber into which any one of said different types of cartridges can be loaded;
   an indicating means for indicating the length of the film contained in the cartridge loaded in said housing chamber, wherein said indicating means includes indicating portions which can be selected in accordance with a corresponding one of said cartridges so that the proper length of the film contained in any particular cartridge of said different cartridges can be indicated; and
   means for selecting the indication state of said indicating means according to the kind of the cartridge loaded into said housing chamber, wherein said selecting means is operatively connected to said indicating means and modifies said indicating means so that the indication portion of said indicating means indicates the proper length of film contained in the cartridge loaded into said housing chamber.

2. A camera according to claim 1, in which said camera further comprises an indication portion observation window formed in a part of said housing, wherein the indication part of said indicating means can be observed from outside of said housing through said observation window.

3. A camera according to claim 1, in which said selecting means has a detecting member in the cartridge housing chamber for detecting the kind of cartridge loaded into said housing chamber, wherein said selecting means automatically selects the indication portion of the above mentioned indicating means in accordance with the kinds of cartridges loaded into the housing chamber when said cartridges are loaded into said housing chamber.

4. A camera according to claim 1, in which said camera further comprises an opening and closing cover of said housing chamber which is opened or closed depending on the kinds of cartridges when the cartridges are loaded into said housing chamber.

5. A camera according to claim 4, in which the above mentioned selecting means includes a detecting member in said cartridge housing chamber for detecting the opening and closing state of said opening and closing cover corresponding to the kind of cartridge loaded into said housing chamber, wherein selecting means automatically selects the indication portion of said indicating means according to the kind of cartridge loaded into said housing chamber as said cartridge is loaded into said housing chamber.

6. A camera according to claim 1, in which said different shaped film cartridges have a film take-up reel to take up the exposed film, and said camera further comprises:
   a film take-up driving means in said housing chamber, said driving means being able to be operatively connected with the film take-up reel of any of said different cartridges, wherein said driving means drives said film take-up reel when the camera is operated for taking up exposed film; and
   a footage counter which is operatively connected to said film take-up driving means to count the length of exposed film in said cartridge, said footage counter further including:
   a counting mechanism having a plurality of operating modes, a particular operating mode selected according to the particular kind of cartridge, for counting the length of exposed film in said cartridge, wherein said mechanism is operatively connected to selecting means and the selection of operating mode is effected by said selecting means; and an indicating member to indicate the counted value by said counting mechanism at the indication portion of the indicating means, wherein said indicating member is operatively connected to said counting mechanism and is shifted on said indication portion along with the operation of said mechanism.

7. A motion picture camera, having an opening for exposing film and a film take-up reel for taking up exposed film and is adapted to use a film cartridge selected from a group of different kinds of film cartridges containing films of respectively different length comprising:

a housing containing a cartridge housing chamber into which any one of said different kinds of cartridges can be loaded;

a film take-up driving means to drive the film take-up reel of the cartridge loaded into said housing chamber as the camera is operated for taking up the film which is exposed by having it pass through the film exposure opening of said cartridge, wherein said driving means can be operatively connected to the film take-up reel of any of said different kinds of cartridges in said housing chamber;

a footage counting means which counts the length of exposed film taken up by said film take-up reel, wherein said counting means is operatively connected to said driving means and includes an indication portion which can be modified in accordance with any one of said group of different kinds of cartridges for indicating the length of exposed film in said cartridge and;

modifying means to modify the indication portion of said footage counting means in accordance with the kinds of cartridges loaded into said housing chamber, wherein said modifying is operatively connected to said footage counting means to modify said indication portion of the counting means, so that it indicates the length of exposed film at the film cartridge loaded into said housing chamber, whereby when different kinds of film cartridges containing films of different lengths are used in said camera, proper indication of counted value of the length of exposed film is effected at the cartridge in accordance with the kind of cartridge inserted.

8. A motion picture camera according to claim 7, in which said motion picture camera further comprises;

an indication portion observation window formed at a part of the said housing, wherein the indication portion of said footage counting means can be observed from outside of said housing through said observation window.

9. A motion picture camera according to claim 7, in which the said modifying means includes a detecting member in said cartridge housing chamber for detecting the kinds of cartridges loaded into said housing chamber, wherein said modifying means automatically modifies the indication portion of said footage counting means in accordance with the kind of cartridge loaded into said housing chamber, when said cartridge is loaded into said chamber.

10. A motion picture camera according to claim 7, in which said motion picture camera further comprises an opening and closing cover of said housing chamber, said chamber being opened and closed according to the kind of film cartridge as said cartridges are loaded into the above mentioned cartridge housing chamber.

11. A motion picture camera according to claim 7, in which said modifying means includes a detecting member in said cartridge housing chamber for detecting the opening and closing state of said opening and closing cover, wherein said modifying means automatically modifies the indication of said footage counting means according to the kind of cartridge loaded into the housing chamber as said cartridges are loaded into said chamber.

12. A motion picture camera according to claim 7, in which said footage counting means includes a counting mechanism having a plurality of operating modes and adapted to have its operating mode modified in accordance with the kind of film cartridge loaded in said camera, for counting the length of exposed film at said cartridges, wherein said mechanism is operatively connected to said modifying means, and the modifying of said operating mode is effected by said modifying means at the same time as the indication portion is modified.

13. A motion picture camera according to claim 12, in which said footage counting means further includes an indicating member to indicate the counted value of said counting mechanism on said indication portion, and wherein said indication member is operatively connected to said counting mechanism and is modified along with the operation of said mechanism.

14. A motion picture camera adapted for use with either a first film cartridge which is equipped with a film exposure opening and a film take-up reel for taking up exposed film and containing a film of predetermined length or a second film cartridge which is equipped with a film exposure opening and a film take-up reel to take up exposed film and containing a film with longer length than the predetermined film length of the first cartridge, said camera comprising:

a housing having therein a cartridge housing chamber within said housing, wherein either one of said first or second cartridges can be loaded into said chamber;

a film take-up means provided within said housing chamber, and being able to be operatively connected to the film take-up reel of either one of the first or second cartridges;

a driving means to drive said film take-up means;

a footage counting means for counting the length of exposed film in said cartridges, wherein said counting means having two operating modes is operatively connected to said take-up means within said housing and can operate in either one of a first operating mode for counting the length of exposed film in said first cartridge or a second operating mode for counting the length of exposed film in said second cartridge, and further includes an indication portion which can be changed according to the operating mode for indicating the counted value in said first and second operating modes, and means for changing the operating mode of said counting means and said indication portion corresponding to the particular cartridge loaded into said housing chamber, wherein said changing means is operatively connected to said counting means, and the operating mode of the counting means can be changed between the first mode and second mode corresponding to the cartridge loaded into the housing chamber, and wherein said indication portion is also changed corresponding to the operating mode of the counting means, both changes being effected by said changing means.

15. A camera according to claim 14, which further comprises an indication portion observation window formed in said housing, and allowing observation of the indication portion of said footage counting means from outside of said housing.

16. A camera according to claim 15, in which said footage counting means further comprises:
a first indicating member for indicating the length of film contained in the first film cartridge and is fixedly placed so as to be observable through said indicative portion observation window; and
a second indicating member for indicating the length of film contained in the second film cartridge, said member being operatively connected to the said changing means, said second member being shiftable between a first position out of the line of sight of said observation window and a second position in which the second member is oriented between the first indicating member and the observation window so as to be observable through said observation window in place of said first indicating member, wherein the second indicating member is set at said first position in the first operating mode of the footage counting means and is set at said second position in the second operating mode of said footage counting means by said changing means.

17. A camera according to claim 16, in which said footage counting means comprises;
a first counting mechanism for operation in said first operating mode;
a second counting mechanism for operation in said second operating mode; and
a pointing member to point out the counted values of said first and second counting mechanisms on said first and second indication members, wherein said pointing member can be operatively connected to both of said mechanisms and can be shifted on said first and second indicating members along with the operation of both of said mechanisms, wherein the state of shifting of said pointing member can be observed through said observation window, and wherein said first and second counting mechanisms are operatively connected to said changing means and are selectively operated by said changing means corresponding to the cartridge loaded into the housing chamber.

18. A camera according to claim 15, in which the indication portion of the footage counting means comprises:
an indicating member having a first indication zone for indicating the length of film contained in the first film cartridge, and a second indication zone for indicating the length of film contained in the second film cartridge, said second indication zone for cooperative use with said first indication zone, wherein said indicating member is fixedly placed at a position observable through said indication portion of said observation window; and
a shielding member for selectively shielding said second indication zone of the indicating member within said observation window for changing the indication state of said indicating member, wherein said shielding member is connected to the changing means and is shiftable between a first position shielding said second indication zone within the observation window and a second position being outside the observation window, wherein said shielding member is set at the first position in the first operating mode of the footage counting means and is set at the second position in the second operating mode by said changing means.

19. A camera according to claim 18, in which said footage counting means includes:
a film length counting mechanism which can be changed between said first operating mode and said second operating mode, wherein said changing over means is operatively connected to said counting mechanism to set the operating mode of said mechanism in accordance with the kind of cartridge loaded into the said housing chamber; and
a pointing member to point out the counted value of said mechanism on said indicating member, wherein said pointing member is coupled with said mechanism and is shifted into the first indication zone of the indicating member in the first operating mode, and wherein the pointing member is coupled to said mechanism and is shifted into the first and second indication zone of said indicating member in the second operating mode, and also wherein the shifted condition of said pointing member can be observed through said observation window.

20. A camera according to claim 15, in which the said footage counting means includes a film length counting mechanism which can be changed between said first operating mode and second operating mode, and wherein said changing means is operatively connected to said mechanism for setting the operating mode of the mechanism between the first operating mode and the second operating mode corresponding to the kind of cartridge loaded into the housing chamber.

21. A camera according to claim 20, in which the indication portion of said footage counting means comprises;
a first indicating member to indicate the counted value of said counting mechanism during said first operating mode, and a second indicating member to indicate the counted value of said mechanism during said second operating mode, wherein said first and second indicating members are operatively connected to said counting mechanism, and are disposed so as to be observable through said observation window; and
an indication portion changing member provided between said first and second indicating members and said observation window, wherein said changing member is operatively connected to said changing, and includes a first opening for making the indication state of the first indicating member observable through the observation window and a second opening for making the indication state of the second indicating member observable through said observation window, so that the indication of counted value by the first indicating member occurs during the first operating mode, and the indicative of the counted value by the second indicating member occurs during the second operating mode.

22. A camera according to claim 14, in which the said changing means includes means for detecting the kind of cartridge loaded into said housing chamber, wherein the changing means is responsive to said detecting means and automatically changes the operating mode of said footage counting means and said indication portion corresponding to the kind of cartridge loaded into the housing chamber, as said cartridge is loaded into said chamber.

23. A camera according to claim 14, which further comprises a cover for said housing chamber, said cover being opened only when said second cartridge is used, and being closed when said first cartridge is used.

24. A camera according to claim 23, in which said changing means comprises a detecting member in the cartridge housing chamber for detecting the opening and closing state of said cover corresponding to the kind of cartridge loaded into said housing chamber, wherein said changing means automatically changes the operating mode of the footage counting means and said indication portion corresponding to the kind of cartridge loaded into the housing chamber in response to said detecting member, as said cartridge is loaded into the housing chamber.

25. A camera according to claim 14, which further comprises:
a first opening and closing cover for said housing chamber, which cover when open allows the loading of the first cartridge into the housing chamber, and,
a second opening and closing cover of said housing chamber, cooperating with the first cover, said second cover, when open, allowing the second cartridge to be loaded into the housing chamber.

26. A motion picture camera adapted for use with either a first cartridge which is equipped with a film exposure opening and a film take-up reel to take up film which has been exposed by passing through said opening, and containing a film of predetermined length, or a second cartridge which is equipped with a film exposure opening and a film take up reel to take up the film which has been exposed by passing through said opening, and containing a film with longer length than said film of predetermined length, said camera comprising:
a housing, having therein a cartridge housing chamber within said housing, wherein either the first or the second cartridge can be loaded into said chamber;
a film take-up means provided within said housing chamber, and being able to be operatively connected to the film take-up reel of either the first or second cartridge;
a driving source to drive said film take up means,
a footage counter being operatively connected to said film take-up means for counting the length of exposed film in said chambers, and including:
a footage counting mechanism being able to have its operation changed between a first operating mode for counting the length of exposed film in the first cartridge and a second operating mode for counting the length of exposed film in the second cartridge;
an indication portion for indicating the length of films contained in the first and second cartridges, the indication condition of said portion being changeable corresponding to the operating mode of said mechanism; and
a pointing member for pointing out the counted value of said counting mechanism at said indication portion, wherein said pointing member is operatively connected to said mechanism and is shiftable on said indication portion together with the operation of said mechanism;
an indication portion observation window formed in said housing, wherein the indication portion of said counter and the pointing member is observable through said observation window from outside of said housing; and
a changing means for changing the operating state of the footage counter corresponding to the kind of cartridge loaded into the housing chamber, and being operatively connected to said counting mechanism and said indication portion so that said changing means changes the operating mode of the counting mechanism and the indication portion in accordance with the cartridge loaded in the housing chamber so that said counter will count the length of exposed film in a loaded cartridge and provide indication of the counted value;
whereby when two kinds of film cartridges containing films of different lengths are used, indication of the length of film contained in said cartridges, counting of the length of exposed film, and indication of counted value is provided corresponding to the kind of cartridge loaded in said camera.

27. A motion picture camera adopted for use with either a first cartridge of a predetermined size being equipped with a film take-up reel to take up the exposed film and containing a film of a predetermined length, or a second cartridge of a larger size, including a first portion containing film and a second portion to be loaded into a camera, having a film take-up reel for taking up exposed film at said first portion and a rotating shaft for supplying a rotating force to said film take-up reel, and containing a film being longer than said film of predetermined length, said camera comprising:
a housing, having therein a cartridge housing chamber within said housing, wherein either the first cartridge or the second portion of the second cartridge can be loaded into said housing chamber;
an opening and closing cover of said housing chamber, said cover being opened only when the second cartridge is used and closed when the first cartridge is used;
a film take-up means being provided within the housing chamber, and being able to be operatively connected to either one of the film take-up reel of the first cartridge or the rotating shaft of the second cartridge;
a driving source for driving said take-up means;
a footage counter being operatively coupled to the take-up means for counting the length of exposed film in a cartridge loaded in said camera, said counter including:
a first footage counting mechanism for counting the length of exposed film in the first cartridge,
a first indication means for the counted value of the first mechanism,
a second counting mechanism for counting the length of exposed film in the second cartridge, and
a second indication means for indicating the counted value of the second mechanism,
wherein the first counting mechanism and the first indication part comprise a first operating pair, and the second counting mechanism and the second indication part comprise a second operating pair, the first and second operating pair being selectively operated, corresponding respectively, to the first and second cartridges;

an indication means observation window formed in said housing, wherein the first and second indication means of the footage counter are observable through said observation window from outside of the housing, and a changing means for changing the operation of said footage counter in association with the opening and closing operation of the opening and closing cover, wherein said changing means is responsive to the opening and closing state of said cover in the housing chamber and is operatively coupled to said footage counter for automatically effecting such change that when said cover is in a closed state said first counting mechanism is allowed to function and first indication means can be observed through the observation window, and when said cover is in an opened state said second counting mechanism is allowed to function and the second indication means is observable through the observation window.

28. A motion picture camera adapted to use either a first or second film cartridge having film exposure openings and film take-up reels to take up exposed film, and containing films of different lengths within said cartridges, said camera comprising:
 a housing containing therein a cartridge housing chamber into which either one of said first and second cartridges can be loaded;
 a film take-up means provided within said housing chamber being able to be operatively coupled to the film take up reels of either of said first and second cartridges;
 a driving power soure for driving said take-up mean;
 a driving force transmitting means being operatively coupled to said driving power source and said take-up means for transmitting the driving force of said driving power source to said take up means, and being adapted to being changed between a first operating mode for transmitting the driving force corresponding to the first cartridge and a second operating mode for transmitting the driving force corresponding to the second cartridge;
 a footage counter being operatively coupled to said take-up means for counting the length of exposed film at said cartridges, being adapted to being changed between a first operating mode for counting the length of exposed film in the first cartridge and a second operating mode for counting the length of exposed film in the second cartridge and including an indication portion which can be changed to indicate the counted value in said first and second operating modes; and
 a changing means for changing adapted operating mode of said driving force transmitting means and the operating mode of the footage counter corresponding to the film cartridge loaded in the housing chamber;
 whereby when two kinds of film cartridges containing films of different lengths are used, changing of the transmission operation of the film take-up driving force and of the counting operation of the length of exposed film is performed corresponding to which cartridge is inserted in said camera.

29. A motion picture camera adapted to use either a first or second film cartridge having film exposure openings and film take-up reels for taking up exposed films, and containing films of different lengths within said cartridges, wherein said camera comprises:
 a housing containing therein a cartridge housing chamber into which either one of said first and second cartridges can be loaded;
 a film take-up reel provided within said housing chamber, wherein said take-up means can be operatively coupled with the film take-up reels of either one of the first and second cartridges;
 a driving power source for driving said film take-up means;
 a driving force transmitting means for transmitting the driving force of said driving power source to the film take up means, having first and second power transmitting mechanisms which can be changed so that different driving force can be transmitted to the wind up means, wherein said first and second mechanisms can be operatively and selectively coupled to the take-up means;
 a footage counter being operatively coupled to the take-up means to count the length of exposed film at the cartridges, and including:
 a first footage counting mechanism for counting the length of exposed film at the first cartridge;
 a first indication means for indicating the counted value of said first counting mechanism;
 a second footage counting mechanism for counting the length of exposed film at the second cartridge; and
 a second indication means for indicating the counted value of said second counting mechanism, wherein the operation of the first counting mechanism and the first indication means, as a unit, and the operation of the second counting mechanism and the second indication means, as a unit, can be changed corresponding to the first and second cartridges;
 an indication means observation window formed in said housing, wherein the first and second indication means of the footage counter is observable through the observation window; and
 a changing means for changing the operating mode of said power transmitting means and the operating mode of said footage counter corresponding to the film cartridge loaded into the housing chamber, wherein said changing means is operatively coupled to the power transmission means and the footage counter, said power transmission means and the footage counter are changed by the changing means so that when the first cartridge is loaded, the first power transmission mechanism and the first counting mechanism are allowed to function and the first indication part can be observed through the observation window, and when the second cartridge is loaded, the second power transmission mechanism and the second counting mechanism are allowed to function and the second indication part is observable through said observation window.

30. A motion picture camera adapted to use with either a first cartridge of a predetermined size having a film take-up reel for taking up exposed film and containing a film of predetermined length, and a second cartridge of a larger size consisting of a first portion containing film and a second portion for loading into a camera, having a film take-up reel for taking up exposed film in said first portion and a rotating shaft to transmit rotating force to said film take-up reel in said second portion, and containing a film being longer than said film of predetermined length, the camera comprising:
- a housing, containing therein a cartridge housing chamber wherein the entire first cartridge or the second portion of the second cartridge can be loaded into said housing chamber;
- an opening and closing cover for the housing chamber, said cover being opened only when the second cartridge is inserted, and being closed when the first cartridge is inserted;
- a film take-up means being provided within the housing chamber, and being able to be operatively coupled with either the film take-up reel of the first cartridge and the rotating shaft of the second cartridge;
- a driving power source to drive the take-up means;
- a power transmitting means being operatively coupled to both the driving power source and the take-up means to transmit the driving power to the take up means, and transmitting means including:
  - a first power transmitting mechanism for transmitting such driving force to said take up means as is suitable for driving the film take up reel of the first cartridge, and
  - a second power transmitting mechanism to transmit such driving force to the take up means as being suitable for driving the film take up reel of the second cartridge, wherein said first and second power transmitting mechanisms can be operatively connected to the take up means, selectively,
- a footage counter operatively coupled to the take-up means for counting the length of exposed film in the cartridges, and including:
  - a first footage counting mechanism to count the length of exposed film in the first cartridge,
  - a first indication means to indicate the counted value of said first mechanism,
  - a second footage counting mechanism to count the length of exposed film at the second cartridge, and
  - a second indication means to indicate the counted value of said second mechanism, wherein said first counting mechanism and the first indication part can be operated while said second counting mechanism and the second indication part can be operated, selectively, corresponding to the above mentioned first and second cartridges;
- an indication means observation window formed in said housing, wherein said first and second indiction means of the footage counter are observable from outside of the housing through said observation window; and
- a changing means to change the operation of said power transmitting means and the operation of said footage counter in association with the opening and closing of said cover, wherein said changing means detects the opened or closed state of said cover and at the same time is operatively coupled to both the power transmitting means and the footage counter, so that:
  - a. when the cover is in a closed state, the first power transmitting mechanism is operatively coupled to the take-up means, and at the same time the said first footage counting mechanism is allowed to function and the first indication means is observable through the observation window; and
  - b. when the cover is in a closed state, the second power transmission mechanism is operatively coupled to the take-up means and at the same time the second footage counting mechanism is allowed to function, and the second indication means is observable through the observation window;
- whereby when two kinds of film cartridges of different size are used, automatic change of the film take up power, counting of the length of exposed film, and the indication of counted value are performed corresponding to the kind of cartridge employed.

* * * * *